Aug. 1, 1944.  E. P. SMITH  2,354,888

VALVE CONTROL SYSTEM

Filed Nov. 14, 1942

Inventor
EDWARD P. SMITH
By
Alfred P. Rees
Attorney

Patented Aug. 1, 1944

2,354,888

UNITED STATES PATENT OFFICE 2,354,888

VALVE CONTROL SYSTEM

Edward P. Smith, Mansfield, Ohio, assignor to The Ohio Brass Company, Mansfield, Ohio, a corporation of New Jersey Application November 14, 1942, Serial No. 465,823

17 Claims. (Cl. 137—139)

This invention relates to controls for valves and in its more specific aspects relates to a remote control means for opening and closing a high pressure relatively large bore valve and more particularly to a piston type valve operable with pressure fluid derived from the pipe line in which it is employed.

The object of this invention is to provide a control for a piston valve that will be governed from a position remote from the valve itself.

Another object of the invention is to provide an electrical means to open and close a piston valve from a station remote from the valve.

A still further object of the invention is to provide an electrical control for a piston valve that will restore the pilot to a neutral position following each operation of the control.

Another and further object of the invention is to provide a remote control piston valve which will first open a valve a predetermined amount, then return the pilot to a neutral position and upon further engagement will close the valve and again restore the pilot to a neutral position.

A still further object of the invention is to provide a remote control for a piston valve which includes a signal means to inform the operator of the exact condition of the valve.

A still further object of the invention is to provide an electrical control for a piston valve that will cause the pilot of said valve to perform a predetermined sequence of operations.

A still further object of the invention is to provide a control for a remotely located piston or other type valve that will open and close same and simultaneously inform the operator of the exact condition of the valve.

Another and still further object of the invention is to provide a remotely located valve in a high pressure gas or oil line with means to substantially instantaneously open or close said valve and thereby obviate the presence of an operator to open and close same.

A still further object of the invention is to provide an electrical control for a remotely located valve that can actuate said valve with a low power requirement and assure the operator of a predetermined sequence of valve operation.

Other and further objects of the invention will occur to those skilled in the arts to which this invention pertains as the description proceeds which, taken in connection with the accompanying drawings, sets forth a preferred embodiment of the invention, but such disclosure is not to be construed as a limitation of the invention, which is limited only by the appended claims and any and all modifications, alterations and variations of structure coming within the spirit and scope thereof are deemed to be included herein.

Figure 1:
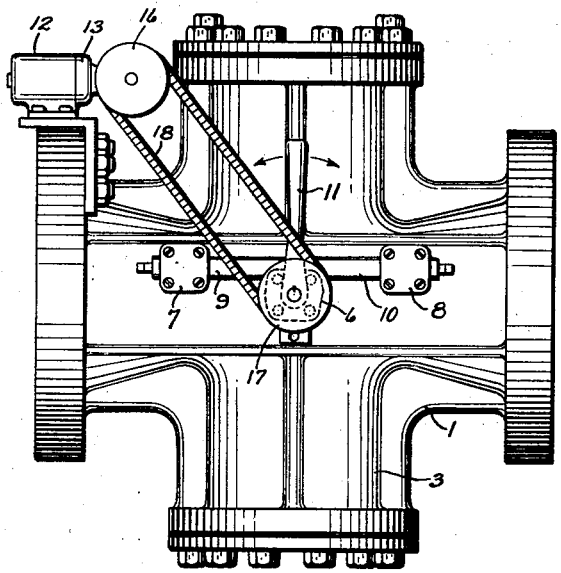
Fig. 1 shows a front elevational view of a piston valve incorporating the invention.
Figure 2:
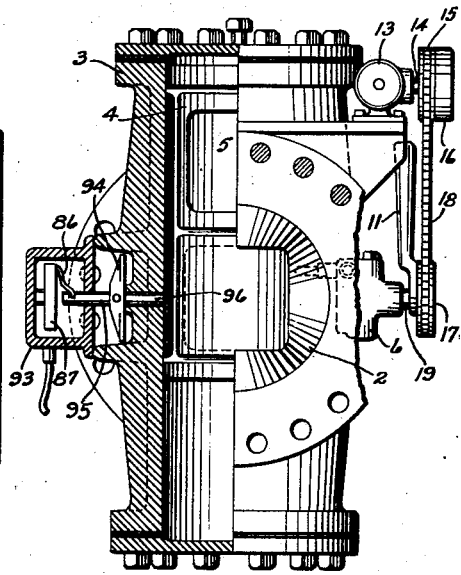
Fig. 2 shows an end elevation thereof with parts in section to show detail.
Figure 4:
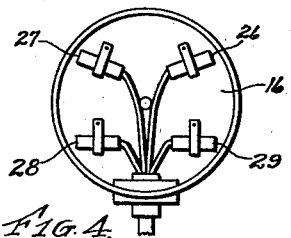
Fig. 4 shows a view of the timing switches and their housing with cover removed.
Figure 5:
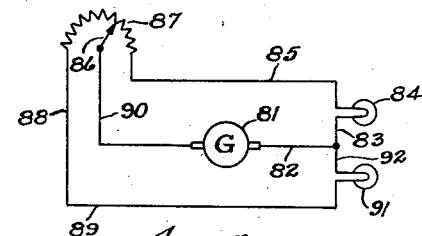
Fig. 5 shows a wiring diagram of the signal control.

The control of valves in transcontinental oil and gas lines of relatively high unit pressure is generally accomplished by despatching an operator to the valve station and having him perform the necessary opening and closing operations. These valves are sometimes equipped with a power means in the form of an electric motor and at times embody means to operate the valve with pressure fluid derived from the conduit or pipe line transmitting same. Even when the valves are operated by means of an electric motor it is still necessary for the operator to be present at the valve station to actually perform the necessary switching operations. This method necessarily has its limitations as frequently the valve station is at a considerable distance from the supervisory station and much time is consumed in having an operator or attendant travel to the valve station. Considerable damage and loss is frequently encountered in time delays that could have been obviated with a faster opening and closing of selected valves at the valve station. In order to secure a much speedier control of remotely located valves applicant has conceived a control system to govern the opening and closing of valves in a pipe line valve station from a position remote from said station and which is so constructed and arranged that the operator will have definite information on the condition of each valve and that will enable the operator to only partially open or close a valve as occasion requires.

The embodiment of the above objects and purposes is set forth in the disclosure contained in the attached drawings in which 1 is a valve body having a passage-way 2 therethrough and that has a cylinder 3 associated therewith having a piston 4 reciprocably mounted therein to clear or obstruct the passageway 2 to open or close the valve. Piston 4 has a passage-way 5 therein that in open position coincides with passage-way 2, The pressure fluid for reciprocating piston 4 is derived from the pressure fluid flowing through passage-way 2 and its admission to the ends of cylinder 3 is governed by pilot valve 6; the pressure fluid being transmitted to pilot valve 6 from conduits (not shown) formed in the wall of valve body 1 and controlled by stop valves 7 and 8. Other conduits not shown connect the pilot valve 6 with the ends of cylinder 3. The latter conduits are formed in the wall of the valve body 1 and the former conduits are formed in separate elements 9 and 10. A more detailed construction of the pilot valve and conduits is set forth in the co-pending application of Homer J. Shafer, S. N. 415,357, filed October 17, 1941, entitled Piston valves.

The pilot valve 6 is manually controlled by means of a handle 11 secured to an extension of the stem of the valve 6. Attention is invited to the fact that pilot valve 6 is in reality a reversing valve whereby pressure fluid is selectively directed to the ends of cylinder 3 to reciprocate the valve piston 4. When it is desired to shift piston 4 the handle 11 is moved from its central neutral position to either fully opened or closed or in any intermediate position and then restored to the neutral position as shown in Fig. 1. Further detailed discussion as to the operation of the valve 6 will be found in the above identified pending application.

It being true that the handle 11 must be restored to its neutral position following each operation thereof, it is evident that any power system, even though remotely controlled must perform the same operation; viz: shift the handle to one side until the piston has assumed the desired position and then restore it to its central neutral position. At such time when the opposite or reverse movement of the piston is desired the handle 11 is swung or turned in the opposite direction from the first mentioned movement and held there until the piston has been moved to the desired position. It is essential that the handle 11 always be restored to its neutral central position for reasons more fully set forth in the above described pending application.

The mechanism for rotating the stem of valve 6 originates in a single phase, reversing capacitor motor 12 appropriately mounted on a flange of the valve body 1 having a speed changer housing 13 associated therewith and which has mounted therein a shaft 14 on which is removably secured a pulley or sprocket wheel 15. Fixed to the shaft 14 juxtaposed to sprocket wheel 15 is a timing or limit switch housing 16 of the explosion-proof type containing the necessary time, centering and limit switches, subsequently more particularly described. The stem 19 of valve 6 has been extended to accommodate a pulley or sprocket 17 in addition to handle 11 and a chain or other power transmitting means 18 is connected between pulleys or sprockets 15 and 17. Motor 12 is preferably of the explosion-proof type particularly suitable for outside usage and upon energization will shift pilot or reversing valve 6 to a predetermined position. The starting of the motor is controlled by the push button switch 20 which may be remotely located from the valve, preferably at an operator's desk. The operation and circuit sequences are subsequently set forth in greater detail.

When the push button 20 is depressed it will energize the relay 21 which is connected across lines 30 and 31 by means of the leads 32 and 33 being connected in series with coil 21, thence connecting the entire circuit across the lines. The bridging element 34 of the relay 21 normally connects contacts 35 and 36 but when energized breaks this connection and bridges contacts 37 and 38. As soon as the contacts 37 and 38 are bridged, relays 22 and 23 are energized by being connected across the lines 30 and 31, which is accomplished by closing a circuit including line 31, bridging element 34, leads 39, 40 and relay coil 22 to line 30 and line 31, element 34 leads 39, 40, 41 and relay coil 23 to line 30. Relay 23 is of the impulse type as shown in more detail on page 21 of Catalog No. 2 of the Leach Relay Company, Los Angeles, California. The energizing of relay coil 22 will cause bridging element 45 thereof to engage contacts 42 and 43. The energizing of impulse relay 23 will cause its bridging element 46 to shift from contact 49 to the dotted line position to contact 48 which position the element 46 will hold until a subsequent energizing of the relay 23. The closure of relay 22 and shifting of impulse relay 23 will cause contactor coil 25 to be energized thereby causing contacts 63 and 64 to be bridged by element 60 to thereby rotate the motor 12 in a clockwise direction.

The energizing circuit for the coil of contactor 25 originates in the line 31, and includes bridging element 34, lead 39, bridging element 45, lead 56, limit switch 27, lead 57, limit switch 26, lead 50, bridging element 46, contact 48, lead 59, relay coil 25 and thence to line 30. Since the actuation of contactor 25 caused its bridging element 60 to connect contacts 63 and 64, a motor circuit is established extending from line 31, including lead 68, bridging element 60, lead 62, motor 12, and terminating on line 30.

Motor 12 has now commenced to rotate and will continue to do so until element 16 has rotated approximately 45 degrees simultaneously shifting pilot valve 6 to one of its open positions which must move through about the same degree of travel as element 16 and will thereby cause piston 4 to be moved in the cylinder 3. When the housing 16 has been rotated to the limit of its travel as determined by either of the limit switches 26 and 27 the motor 12 will cease rotating because the contactor holding the circuit will be broken. The switches 26 and 27 are mercury switches and since the housing 16 has been assumed to rotate in a clockwise direction switch 26 will level off causing the switch to open by reason of the mercury flowing from the end where the lead in wires enter, thereby opening the holding circuit to the contactor coil 25 causing it to be released and consequently opening the circuit to motor 12. The button switch 20 has been and must be depressed during all of this time or until the piston 4 has reached its predetermined desired position.

The release of the push button switch 20 immediately energizes other control circuits that reverses the rotation of motor 12 to return the pilot valve and handle 11 to its neutral or central position as shown in Fig. 1 and deenergizes coils 21, 22, and 23 causing coils 21 and 22 to drop to open position as indicated. This action establishes circuits for energizing the contactor 24. The circuit for this control extends from lead or line 31 over a portion of lead 68, lead 70, bridging element 34, across contacts 35 and 36, lead 53, switch 28, lead 58, and thence over a portion of lead 51 to the relay coil 24 and to line 30. The reason why this circuit path is followed is that when button 20 is released coils 21, 22, and 23 are deenergized thereby opening the contacts of coils 21 and 22 which causes bridging element 34 to again bridge contacts 35, 36. Since element 16 was tilted 45 degrees clockwise the switch contacts of centering switch 28 were closed thereby closing the circuit just described.

When relay 24 has been energized in the manner described the motor 12 will rotate the pilot valve 6 and its handle 11 counter-clockwise to neutral and then stop. This motor circuit comprises line 31, lead 68 to lead 61, bridging and contact elements 65, 66, and 67, lead 69, motor 12 and line 30. Motor 12 will rotate until the switch 28 assumes a horizontal postion whereupon the holding circuit for the contactor coil 24 will be broken de-energizing same, thereby causing the bridging element to break the motor circuit and stop the pilot valve 6 and its handle 11 in the neutral central position shown in Fig. 1.

When it is desired to cause the piston 4 to to move oppositely from the motion it was given as described above the push button 20 is again depressed. This energizes relay 21 that in turn energizes relays 22 and 23 which action restores the bridging element 46 to the full line position shown in Fig. 3.

Relay 21 circuit includes line 31, lead 33, switch 20, lead 32, and relay 21 to line 30. Energization of relay 21 lifted bridging element 34 to the contacts 37 and 38. This action establishes the holding circuits for the relays 22 and 23 which includes line 31 bridging element 34, lead 39, lead 40, and coil 22, and lead 40 continuing to line 41 relay 23 and each of the relays leading to line 30. The energization of relay 22 will cause its bridging element 45 to bridge contacts 42 and 43 and the energization of impulse relay 23 will cause its bridging member to assume the full line position shown in Figure 3. The energization of the relays 22 and 23 will energize contactor 24 to rotate pilot valve 6 and the handle 11 in a counter-clockwise direction as long as the switch 20 is depressed or until stopped by the limit switch 27.

The circuit for contactor 24 now includes the line 31, bridging element 34, leads 39, 44, bridging element 45, lead 56, switch 27, lead 57, switch 26, line 50, bridging element 46, lead 51, and relay 24 to line 30. The motor circuit will comprise line 31, lead 68, lead 61, bridging element 67, motor 12, lead 69, and line 30.

As previously indicated motor 12 will rotate the pilot valve 6 and its handle 11 to the left as long as switch 20 is depressed, or until the element 16 has been rotated its maximum of 45 degrees whereupon the circuit to relay 24 will be broken by the opening of limit switch 27 the latter being a mercury switch. Releasing of switch 20 de-energizes relays 21, 22, and 23, as previously explained.

When the motion of the piston 4 has been stopped at the desired point by either of the methods mentioned switch 20 is released and the motor 12 is reversed by closing the circuit to contactor 25 which is automatically accomplished upon release of switch 20. The circuit established for this comprises line 31, a portion of lead 58, lead 70, bridging element 34, across contacts 35 and 36, lead 53, lead 54, switch 29, since element 16 has been rotated counter-clockwise, lead 52, lead 59, and contactor 25 to line 30. The motor circuit comprises line 31, lead 68, bridging element 60, and motor 12 to the line 30. The motor now rotates clockwise and continues to do so until switch 29 has assumed a horizontal position whereupon the holding circuit to contactor 25 is broken thereby stopping motor 12 and restoring the pilot valve 6 and the handle 11 to the neutral position.

In view of the fact that the switch 20 is remotely positioned or located from the valve body 1, sometimes a distance of several miles, it is necessary to provide some signal to inform the operator of the exact position of the piston in its cylinder 4. This signal is located near the switch 20 such that the operator may readily observe what is going on and to obviate the necessity of interminably holding switch 20 depressed.

The above signal comprises a signal light organization originating in a source of supply 81 that leads to lamp 84 over leads 82 and 83 thence to resistance 87 over lead 85, arm 86, and over lead 90 back to supply 81. The other side of the signal originates at source 81, over leads 82 and 92, to lamp 91, then over leads 88 and 89 to resistance 87 and thence by means of arm 86 and lead 90 back to the source 81. It will be observed that as arm 86 is moving to the right or left that more or less resistance is added to or subtracted from any individual lamp circuit. The relative brightness or dimness of lamps 84 and 91 will inform the operator of the position of the piston 4 in cylinder 3.

The resistance element 82 is rigidly disposed in housing 93 appropriately secured to housing 1. Arm 86 is secured to shaft 95 that is connected to shaft 96 mounting indicator 94. The operation of the indicator 94 is fully described in the above identified pending application. It will be apparent therefore, that as the indicator 94 and its shaft 96 is rotated by the piston that arm 86 will be moved relative to resistance 86. For the sage of convenience lamps 84 and 91 may be differently colored such as red and green, with e. g. the full brilliant green indicating the open positions and full red the closed position of the valve. Varying degrees of brightness and dimness also indicate the partial open or closed position of the valve. Therefore, since both switch 20 and lamp are located at the same place the operator will know the condition of the valve.

The motor is shown as driving the pilot mechanism but it could with equal propriety be made to drive or rotate the disc element of a butterfly valve, open or close a conventional gate valve or combination thereof with equal propriety.

Figure 3:
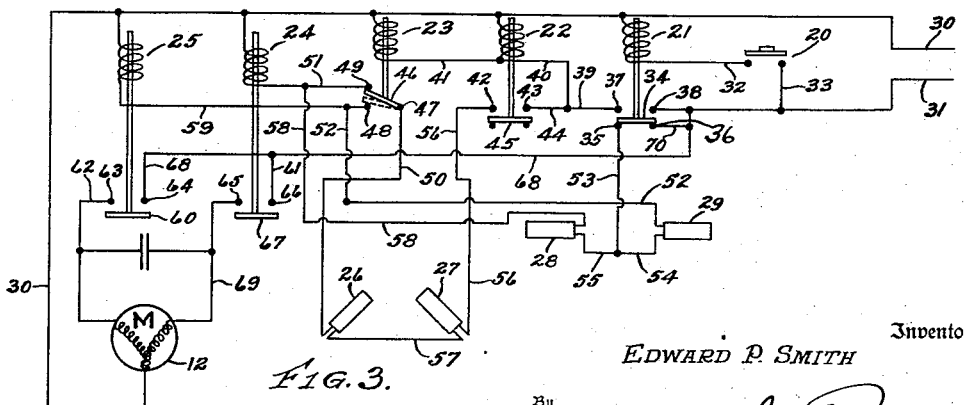
Fig. 3 is a wiring diagram of the essential apparatus.

The above sets forth the operating cycles whereby the pilot valve following any movement thereof is always restored to the neutral central position as shown in Fig. 3. That which is regarded new, novel and useful and which is sought to be protected by Letters Patent of the United States is as follows:

1. In a remote control for a pipe line valve; a control means for a valve; an electrically operated motor to operate said control means; circuit means to operate said motor to shift said control means and to restore same to a central neutral position following each operation of said valve; and a switch for said circuit means remotely located from said valve to govern the energization of said circuit to thereby open or close said valve.

2. In a valve control; a shiftable pilot element normally disposed in a neutral position; a motor to shift said pilot to an open position on either side of said neutral position; circuit means including said motor to govern the rotation thereof in one direction; a switch remotely located to cause said circuit to be closed; and circuit means closable immediately after the opening of said switch to restore said pilot to its original neutral position.

3. In a valve control; a pilot element normally maintained in a neutral position; a reversible motor to shift said pilot to an open position to the right or left of said neutral position; circuit means to govern the rotation of said motor in one direction; a remotely located switch to energize said circuit; switch means in said circuit to limit the movement of said pilot; circuit means closable immediately after the opening of said remote switch to reverse said motor rotation to restore said pilot to its neutral position; and switch means in said last mentioned circuit to stop said motor when said pilot reaches its neutral position.

4. In a remote control system for a valve; a pilot adapted to be maintained in a normally neutral position; a reversible motor to shift said pilot to an open position to the right or left of said neutral position; a circuit means to rotate said motor in one direction; a switch manually operable to energize said circuit and releasable to stop said motor; additional means in said circuit to stop rotation of said motor when said pilot has moved to the limit of its travel; circuit means energizable upon release of said manual switch and actuation of said additional means to reversely rotate said motor; and means in said latter circuit to arrest rotation of said motor when said pilot has been restored to its neutral position.

5. In a valve controller; a valve body; a shiftable element in said valve body maintained in a normally neutral position; a motor to shift said shiftable element; means connecting said motor and said shiftable element; means to control said motor including a control circuit therefor; a manual switch to energize said circuit; means in said circuit to limit the movement of said shiftable element from neutral to open position in either direction of travel; and means in said circuit to restore said shiftable element to its original neutral position upon release of said switch.

6. In a valve controller; a valve body; a movable element in said valve body maintained in a normally neutral position; a motor; means connecting said motor and said movable element; a control circuit for said motor; a manual switch for energizing said circuit; means operable by said motor to control said circuit which includes switches to limit the degree of movement in either direction of movement of said element from its neutral position; and other switches to limit the return movement of said element to its neutral position.

7. In a valve controller; a valve body; means in said body to open and close a passageway therethrough maintained in a normally closed position; a motor; means connecting said motor and said means; a control circuit for said motor; a manual switch remotely located from said valve for energizing said circuit; and a plurality of limit and centering switches in said circuit operable by said motor; said limit switches determining the amount of movement of said means in either direction from its normally closed position; and said centering switches arresting the movement of said means when it has been restored to its normally closed position.

8. In a controller for a valve; a housing; a shiftable valve element therein maintained in a normally neutral position; a motor; means connecting said motor and said valve element; a control element mechanically operatively associated with said motor and constructed and arranged to move in synchronism with said shiftable valve element; a plurality of limiting and centering switches fixed in said control element; circuit means including said motor and some of said limiting switches to shift said valve element from neutral to an open position; a manual switch to energize said circuit; said limit switches arresting the movement of said control element and said valve element when the latter has moved to its maximum open position; a release of said manual switch stopping movement of said valve element and said control element when a movement less than maximum is desired; circuit means including said motor and said centering switches closable immediately upon release of said manual switch to restore said control element and shiftable valve element to neutral position; and said centering switches opening said last mentioned circuit when said valve element and said control element have been restored to neutral position.

9. In a valve controller; a valve housing; a normally closed rotatable valve element in said housing; a motor; means connecting said motor and said valve element; a limit and centering switch supporting element driven by said motor and in timed relation with said valve element; a circuit means including some of said limiting switches and said motor to rotate said valve element to an open position; a manual switch to energize said circuit; said limit switches arresting movement of said supporting element and said valve element when maximum travel has been achieved; another circuit to restore said supporting element and said valve element to closed position including said motor and some of said centering switches; said last mentioned circuit closable immediately upon the release of said manual switch; and said centering switches arresting movement of said supporting element and said valve element when restored to neutral.

10. In a valve controlling device; a housing; a valve element in said housing adapted to be maintained in a central neutral position; a motor; means connecting said element and motor; a limit and centering switch unit operated by said motor and in timed relation with said valve element, said unit having limit and centering switches therein; circuit means including said motor and some of said limit switches to move said valve element from its neutral position; a manual switch to energize said circuit; said limit switches arresting movement of said valve element after a predetermined movement; another circuit including said motor and some of said centering switches to restore said valve to its neutral position; said other circuit energizable upon the release of said manual switch; and said centering switches arresting movement of said valve element when it is in its neutral position.

11. In a control system; a housing; a valve element shiftable in said housing and adapted to be normally maintained in a closed position; a motor to shift said valve element; circuit means including said motor and control means to arrest motion of said valve element when it has moved to predetermined distance from said closed position in either direction of travel; switch means to energize said circuit; other circuit means including said motor and other control means to restore said valve element to its closed position; and said other circuit means closable immediately upon the opening of said switch.

12. In a valve controller; a valve unit normally maintained in a neutral closed position; a motor element; means connecting said motor and said valve unit; a circuit means including said motor and means to arrest motion of said valve after it has moved a predetermined distance from said closed neutral position in either direction of travel; a switch to energize said circuit; other circuit means including said motor and other means to arrest motion of said valve when said valve element has been restored to neutral closed position; and said other circuit closable immediately upon the opening of said switch.

13. In a control system for a reversing valve, in combination; a reversing valve having a normally closed position and shiftable to an open position on either side of said normally closed position; a motor to shift said valve; a speed reducer connected to said motor; means connecting said valve and said speed reducer; a plurality of limiting and centering switches operatively associated with said speed reducer; and circuit means including said limiting and centering switches to return said reversing valve to its normally closed position following each shifting to an open position on either side of said normally closed position.

14. In a remote control system for a pipeline valve; a pilot valve for the pipeline valve shiftable from a neutral closed position to an open position to the right or left of said neutral closed position; a motor to shift said pilot; circuit means to energize said motor to shift said pilot from said neutral to an open position; a switch to close said circuit and thereby initiate movement in said motor and shift said pilot valve; and other circuit means to reversely energize said motor to restore said pilot valve to its neutral closed position, said other circuit closed immediately upon the opening of said switch; and said switch remotely located from said pilot valve.

15. In a remote control for a pipeline valve operable by pressure fluid in the pipeline, the valve having a piston and cylinder element therein; a reversing valve having a normally neutral closed position to control the admission of pressure fluid to the piston cylinder device; a control means for said reversing valve; an electrically operated motor to operate said control means; circuit means to operate said motor to shift said control means and to restore same to a central neutral position following each operation of said reversing valve; and a switch for said circuit means remotely located from said valve to govern the energization of said circuit to thereby open or close said valve.

16. In a remote control for a pipeline valve, comprising; a piston-cylinder valve device for a pipeline operable by pressure fluid derived from said pipeline; a reversing valve body secured to said piston-cylinder valve device, a movable element in said body maintained in a normally neutral position and adapted to selectively admit pressure fluid to either end of said piston cylinder device; a motor; means connecting said motor and said movable element; a control circuit for said motor; a manual switch for energizing said circuit; means operable by said motor to control said circuit which includes switches to limit the degree of movement in either direction of movement of said element from its neutral position; and other switches to limit the return movement of said element to its neutral position.

17. In a remote control for a pipeline valve, comprising; a piston-cylinder valve device for a pipeline operable by pressure fluid derived from said pipeline; a housing secured to said piston cylinder device; a reversing valve element in said housing adapted to be maintained in a central neutral position; a motor; means connecting said element and motor; a limit and centering switch unit operated by said motor and in timed relation with said reversing valve element, said unit having limit and centering switches therein; circuit means including said motor and some of said limit switches to move said valve element from its neutral position; a manual switch to energize said circuit; said limit switches arresting movement of said reversing valve after a predetermined movement; another circuit including said motor and some of said centering switches to restore said valve to its neutral position; said other circuit energizable upon the release of said manual reversing switch; and said centering switches arresting movement of said reversing valve element when it is in its neutral position.

EDWARD P. SMITH.